US008694492B2

(12) United States Patent
Saros et al.

(10) Patent No.: US 8,694,492 B2
(45) Date of Patent: Apr. 8, 2014

(54) PRE-FETCHING OF DATA IN A MOBILE COMMUNICATIONS ENVIRONMENT

(75) Inventors: Jakob Saros, Luleå (SE); Tommy Arngren, Södra Sunderbyn (SE); Srdjan Krco, Dublin (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 7 days.

(21) Appl. No.: 13/127,182

(22) PCT Filed: Nov. 3, 2008

(86) PCT No.: PCT/EP2008/009259
§ 371 (c)(1),
(2), (4) Date: May 2, 2011

(87) PCT Pub. No.: WO2010/060438
PCT Pub. Date: Jun. 3, 2010

(65) Prior Publication Data
US 2011/0213800 A1    Sep. 1, 2011

(51) Int. Cl.
*G06F 17/30* (2006.01)
*G06F 7/00* (2006.01)
(52) U.S. Cl.
USPC ............ 707/722; 707/732; 706/14; 706/15; 706/16

(58) Field of Classification Search
None
See application file for complete search history.

(56) References Cited

U.S. PATENT DOCUMENTS

| | | | |
|---|---|---|---|
| 6,571,279 B1 * | 5/2003 | Herz et al. | 709/217 |
| 2002/0073084 A1 | 6/2002 | Kaurrman et al. | |
| 2004/0162830 A1 * | 8/2004 | Shirwadkar et al. | 707/10 |
| 2007/0100796 A1 | 5/2007 | Wang | |
| 2008/0215623 A1 | 9/2008 | Ramer et al. | |

* cited by examiner

*Primary Examiner* — Angelica Ruiz
(74) *Attorney, Agent, or Firm* — Coats & Bennett, PLLC

(57) ABSTRACT

The invention relates to techniques for controlling a pre-fetching of data in a mobile communications environment. More specifically the invention relates to controlling a pre-fetching of data items into a cache associated with a mobile terminal. A method embodiment of the invention is performed by a cache management server and comprises the steps of receiving a pre-fetching request for data items, wherein the pre-fetching request comprises a first user identification associated with the mobile terminal; obtaining, based on the first user identification, one or more second user identifications from a community database of a social network; selecting items for the pre-fetching based on the second user identifications; and providing the selected items in response to the pre-fetching request.

21 Claims, 9 Drawing Sheets

PRE-FETCHING OF DATA IN A MOBILE COMMUNICATIONS ENVIRONMENT

TECHNICAL FIELD

The invention relates to techniques for controlling a pre-fetching of data in a mobile communications environment. More specifically the invention relates to controlling a pre-fetching of data items into a cache associated with a mobile terminal.

BACKGROUND

Cache management procedures are conventionally performed in mobile communications networks in order to cope with latencies in the presentation of content to mobile users which may occur due to limited network transmission resources. A cache is provided in a mobile terminal, e.g. mobile phone, smart phone, PDA, notebook, or similar terminal device adapted for connection with a mobile communications network. Particular content data items, which may be requested for presentation on the terminal, are downloaded to the cache. Such data items may for example comprise product offers or news such as political or sports information, etc. In case a downloaded data item is actually requested for presentation on the terminal, the item is already available in the cache and can be presented without delay. This download in advance is generally termed 'pre-fetching'.

As eventually any cache is limited in storage, cache management requires a decision logic for deciding which data items to pre-fetch into the cache. Some form of automatic determination has to be performed, which data items from a possibly large set of items are most likely to be queried by the user of the mobile terminal. For example, in a shopping environment the complete set of items may represent all the products of a shop or retailer. A simple determination routine may comprise to pre-fetch those data items related to products bought earlier by the user, which is useful in case the user can be assumed to regularly buy the same products again, e.g. in a supermarket environment. Pre-fetching data items which are most relevant for the user of the mobile terminal not only minimizes latency in the content presentation, but also contributes to minimizing storage resources required for the caching.

Although various procedures for determining data items for pre-fetching are known, the miss rate thereof is generally high, i.e., for example in an advertisement provisioning system many items pre-fetched into a cache may never be requested by the user, which leads to a waste of transmission resources in the network and storage resources in the terminal.

SUMMARY

There is a demand for a pre-fetching scheme which is more efficient in terms of network transmission resource usage and cache storage resource usage.

This demand is satisfied by a method for controlling a pre-fetching of data items into a cache associated with a mobile terminal. The method is performed by a cache management server. The method comprises the steps of receiving a pre-fetching request for data items to be provided by a mobile communications network to the mobile terminal for presentation to a user of the mobile terminal, wherein the pre-fetching request comprises a first user identification associated with the mobile terminal; obtaining, based on the first user identification, at least one second user identification from a community database containing user profiles of users of a social network; selecting items for the pre-fetching based on the obtained at least one second user identification; and providing the selected items in response to the pre-fetching request.

Each of the first and/or second user identification may comprise an identification of a user of the terminal in a mobile communications network, such as an IMSI (International Mobile Subscriber Identity), TMSI (Temporary Mobile Subscriber Identity) or MSISDN (Mobile Subscriber ISDN number). Additionally or alternatively, the user identification may comprise an application-layer identification, such as a user name or login name. For example, the user identification may comprise a user name in the social network.

The cache may comprise a cache in the mobile terminal. In other implementations, additionally or alternatively a cache may be provided on the network side, i.e. in the mobile communications network or in a separate network of a specific service provider. Regarding the placement of the cache in the mobile communications network, the cache may be provided in a radio access part of the mobile communications network, e.g. in association with a BSC (radio Base Station Controller) in a GSM network, an RNC (Radio Network Controller) in an UMTS network or an evolved Node B in an LTE network. In other implementations, the cache may be provided outside the radio network part, in a core network part of the mobile communications network, e.g. in association with a serving MSC (Mobile services Switching Center) in a GSM network, an SGSN (Serving GPRS Support Node) in an UMTS or LTE network, or an SGW (Serving Gateway) or MME (Mobility Management Entity) in an LTE network.

The social network may comprise a plurality of user profiles hosted by the community database, which is to be understood as a functional entity which may comprise one or more database servers arranged locally or in a distributed fashion. The word 'plurality' shall throughout the description and claims be interpreted as 'a number greater than one'. The social network may comprise social network service functions such as, e.g., a search function in order to identify one or more users of the social network based on user profile parameters. The step of obtaining the at least one second user identification may comprise using such a social network service function of the social network for searching the at least one second user identification among a plurality of user identifications forming the community of the social network, each user identification being related to one of the user profiles hosted in the community database.

The second user identifications may be obtained based on one or more attributes from a user profile associated with the first user identification. In one implementation, the attributes comprise a location of the mobile terminal. The attributes may be used to trigger the social network service function, e.g. the search function. For example, a user's age may be retrieved from the user profile associated with the first user identification and may be used to identify second user identifications of social network users of comparable age. In another example, items for the pre-fetching are selected based on item indications of a second user identification related to a user near to the location of the mobile terminal. For example, the at least one second user identification may be related to a mobile terminal which is currently located in the same shop as the mobile terminal of the first user identification.

The social network may be hosted by server nodes being part of the mobile communications network. For example, the social network may comprise users of the communications network and the community database may be part of an HLR (Home Location Register) or HSS (Home Subscriber Server)

of the mobile communications network. In other implementations, the social network is separate from the mobile communications network. For example, the social network may be hosted by a service provider in the Web. As a concrete example, the social network may comprise customers of a retailer.

A user data repository may be provided which contains item indications related to the at least one second user identification. The repository may for example be provided by at least one of the mobile communications network and the social network. In one variant, the method comprises the step, performed by the cache management server, of retrieving from the user data repository one or more item indications related to the second user identification(s), the item indications being termed "community-based" item indications, as these have been retrieved based on the users related to the user of the mobile terminal via the social network. The item indications may explicitly or implicitly indicate data items which may be selected for pre-fetching. The selection of items for the pre-fetching may be based on the retrieved community-related item indications. An item indication may comprise one or more of the data item itself, a specification thereof, and a pointer to a storage place at which the data item is stored.

A user data repository may be provided which contains data item indications related to the first user identification. This repository may be hosted by the same service provider as the repository for the second user identification, or by a different provider. In one implementation the method comprises the further step of retrieving from the user data repository for the first user identification one or more item indications, which are termed "personal" item indications, as these are related to the user of the mobile terminal. The selection of items for the pre-fetching may be based on both the community-based item indications and the personal item indications.

In one realization of the method, the selection of items for the pre-fetching comprises selecting items based on matching community-based item indications with personal item indications. The matching may comprise identical matching or similarity matching. For example in case the items represent products, item indications may match in aspects such as product type or brand, such that data items may be selected for pre-fetch representing products which are similar with regard to these aspects.

Some modes of the method may comprise the step of selecting, based on the first user identification, the social network from multiple social networks. For example, a mobile network indicated by an IMSI may be used as the basis to select a social network associated with that mobile network.

The above-indicated demand is further satisfied by a method for supporting a pre-fetching of data items into a cache associated with a first mobile terminal, wherein the method is performed by a user data repository associated with a second mobile terminal. The method comprises storing, triggered by an operation performed by the second mobile terminal, one or more item indications; and providing, in response to a query from a cache management server, one or more of the stored item indications for pre-fetching into the cache associated with the first mobile terminal.

The user data repository may be associated with the mobile communications network or the social network. The terminal operation triggering storage of the item indications may relate to a shopping activity comprising at least one of purchasing a product item, receiving an offer for a product item and querying a product item. Corresponding item indications may be stored in the user data repository.

The one or more item indications may be stored in association with tags or similar indications, which may comprise, e.g., an indication of a location of the second mobile terminal, a time, a tag manually provided by the user, etc.

Further, the abovementioned demand is satisfied by a computer readable medium having computer executable instructions for performing the method according to any one of the preceding claims. The computer may comprise one or more computing devices for implementing, for example, a cache management server or a user data repository. The computer readable medium may be a permanent or re-writeable memory, e.g. a flash or EEPROM, within or associated with a computing device or a removable CD-ROM, DVD or USB-stick.

The above-indicated demand is further satisfied by a cache management server which is adapted for controlling a pre-fetching of data items into a cache associated with a mobile terminal. The cache management server comprises a component adapted to receive a pre-fetching request for data items to be provided by a mobile communications network to the mobile terminal for presentation to a user of the mobile terminal, wherein the pre-fetching request comprises a first user identification associated with the mobile terminal; a component adapted to obtain, based on the first user identification, at least one second user identification from a community database containing user profiles of users of a social network; a component adapted to select items for the pre-fetching based on the obtained at least one second user identification; and a component adapted to provide the selected items in response to the pre-fetching request.

In some implementations, the cache management server further comprises a component adapted to retrieve, from a user data repository containing item indications related to the at least one second user identification, one or more community-based item indications, and wherein the component adapted to select items for the pre-fetching is adapted to select the items for the pre-fetching based on the retrieved community-related item indications. According to one variant of these implementations, the component adapted to retrieve one or more community-based item indications is further adapted to retrieve, from a user data repository containing data item indications related to the first user identification, one or more personal item indications, and wherein the component adapted to select items for the pre-fetching is adapted to select the items for the pre-fetching based on the community-based item indications and the personal item indications.

The cache management server may be adapted to receive location indications related to at least one of the first and second user identifications. In this case the component adapted to select items for the pre-fetching is adapted to select the items for the pre-fetching based on the received location indications.

In some realizations of the cache management server, the component adapted to obtain the at least one second user identification is adapted to use a social network service function of the social network for searching the at least one second user identification among a plurality of user identifications forming the community of the social network, each user identification being related to one of the user profiles hosted in the community database.

The above-indicated demand is still further satisfied by a user data repository which is adapted for supporting a pre-fetching of data items into a cache associated with a with a first mobile terminal. The user data repository is associated with a second mobile terminal and comprises a component adapted to store, triggered by an operation performed by the second mobile terminal, one or more item indications; and a component adapted to provide, in response to a query from a cache management server, one or more of the stored item indications for pre-fetching into the cache associated with the first mobile terminal.

Moreover, the above-indicated demand is satisfied by a cache management system comprising a cache management server and one or more user data repositories as outlined above.

BRIEF DESCRIPTION OF THE DRAWINGS

In the following, the invention will further be described with reference to exemplary embodiments illustrated in the figures, in which.

DETAILED DESCRIPTION OF PREFERRED EMBODIMENTS

In the following description, for purposes of explanation and not limitation, specific details are set forth with regard to a cache management system in a mobile communications environment in order to provide a thorough understanding of the current invention. It will be apparent to one skilled in the art that the current invention may be practiced in other embodiments that depart from these specific aspects. For example, the skilled artisan will appreciate that the current invention may be practised not only in a shopping environment for a delivery of advertisements and offerings as described below to illustrate the invention, but may be practised in other environments and for other purposes as well. This may include any system for a distribution of content data items to users which aims at providing personalized services. One such example is a news delivery service which intends to provide news of particular interest to each specific user.

Moreover, the invention may be practiced in any communication and information distribution system in which transmission and/or storage resources are limited and a caching approach comprising selecting and caching a subset from a set of information or data items is applied.

Those skilled in the art will further appreciate that functions explained hereinbelow may be implemented using individual hardware circuitry, but also using software functioning in conjunction with a programmed microprocessor, field-programmable gate array (FPGA), application specific integrated circuit (ASIC), one or more digital signal processors (DSPs) or a general purpose processor. It will also be appreciated that when the current invention is described as a method, it may also be embodied in a computer processor and a memory coupled to the processor, wherein the memory is encoded with one or more programs that perform the methods disclosed herein when executed by the processor.

Figure 1:
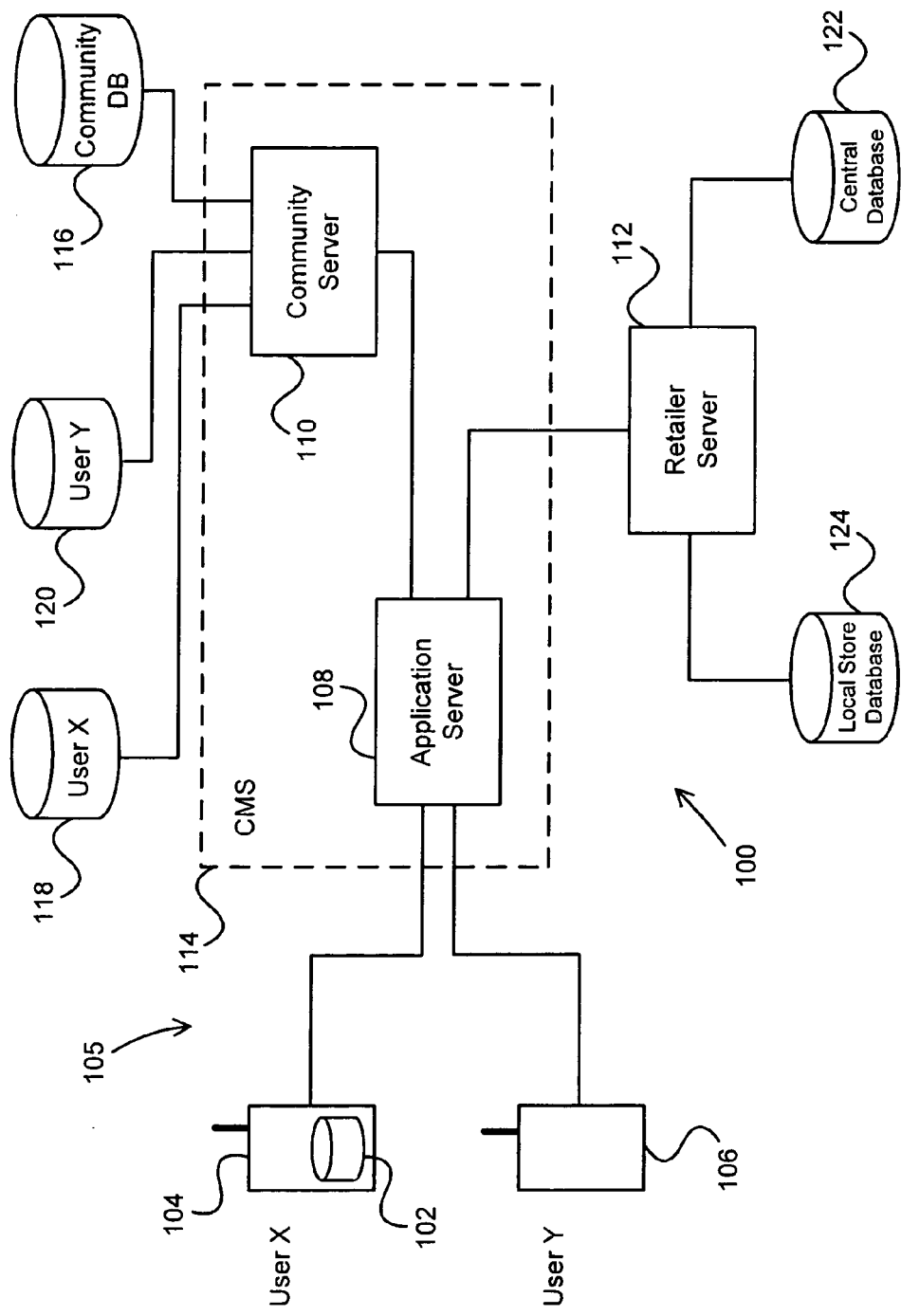
FIG. 1 schematically illustrates an embodiment of a cache management system.

FIG. 1 illustrates an embodiment of a cache management system 100, which serves for providing a pre-fetching of data items into a cache 102 associated with a mobile terminal 104 of a user X. While in the embodiment of FIG. 1 the cache 102 is implemented in the mobile terminal 104, in other embodiments a cache dedicated to a mobile terminal may be provided on the network side, e.g. at a radio access node in an access network part of the serving mobile network 105.

At least one further user Y with mobile terminal 106 is also served by the cache management system 100, which comprises an application server 108, a community server 110 and a retailer server 112. The entity formed by application server 108 and community server 110 will sometimes be referred to as Cache Management Server (CMS) 114 hereafter. There is a flexibility in the separation of functionalities between application server and community server which may for example depend on whether both servers are located in the mobile communications network 105 or whether only the application server is part of the mobile network 105, while the community server is part of a separate network. Some corresponding example embodiments will be described below.

The mobile communications network 105 serving the mobile terminals 104 and 106 is not further shown in FIG. 1 for the sake of clarity. However, as a concrete example, one or both of the application server 108 and community server 110 may be located in an IMS (IP Multimedia Subsystem) domain of the serving mobile network 105 (in other words, in some embodiments only a portion of a CMS may belong to a mobile network). The community server 110 may additionally or alternatively be associated with a social network comprising a plurality of user profiles and possibly a set of social network service functions. The community server 110 has access to a community database 116 hosting user profiles or at least user identifications of users of the social network. Dependent on the specific embodiment, the community database 116 may be implemented on one or more hardware devices and may be implemented on a common hardware basis with the community server 110 or on a separate hardware basis.

The social network users represented in the database 116 may be members of a loyalty system. For example, all the customers of a shop, or of a chain of shops or of a particular brand, etc. may be represented in the database 116. As another example, the community database 116 may store users of an Internet-based social network or a Web-based community such as Facebook, MySpace, Plaxo Pulse, LinkedIn etc. The community server 110 may also have access to multiple different community databases. In this case the community server 110 may identify links, for example users of a first community may also be part of a second community. This allows the community server to define itself 'social groups' incorporating users sharing preferences for the same brands, retailers, locations, etc. As a still further example, the community server 110 may also define a 'social group' as comprising the customers currently visiting a particular shop (single location) or retailer (possibly several locations). Therefore, the community server may not only access the community database 116 for identifying users, but may also generate and maintain data (in the community database 116 or a separate database) in a dynamic way by retrieving data from existing community databases and buffering these data in the database 116 as needed.

The community server 110 further has access to user data repositories 118 and 120 associated with user X of terminal 104 and user Y of mobile terminal 106, respectively. The association may be based on user identifications such as IMSI or MSISDN. Alternatively or additionally, a specific application-layer user name or login name may be used. With regard to the shopping environment used to illustrate the techniques proposed herein, the repositories 118 and 120 may collect data items or indications thereof associated with products which have been bought or queried in the past by the user, or which have been offered to the user.

In the embodiment illustrated in FIG. 1, the community server 110 accesses the user data repositories 118 and 120. In other embodiments, the data repositories may be accessed by the application server. The user data repositories may be provided by the mobile communications network 105 serving the mobile terminals 104 and 106, and may store any indications of any items bought by the users X and Y using their mobile terminals 104 and 106, respectively.

The retailer server 112 manages for a specific retailer a central retailer database 122 which is assumed to identify all products offered and sold by the retailer. The products may be identified by GTINs (Global Trade Item Numbers), i.e. product IDs based on one of the standards defined by the GS1 (Global Standards 1) organization. Further, the retailer server 112 may manage multiple databases of a chain of local stores operated by the retailer. One such database 124 is illustrated in FIG. 1. The database 124 may comprise product IDs of products offered and sold by the local store. As an example, when accessed by the CMS 114 with a location indication related to the local store, the retailer server 112 may primarily provide product IDs from the local store database 124. The database 126 may be queried in case no location indication is provided, the location indication does not match to any of the local stores, or there is no access to a specific database such as database 124.

The retailer server 112 may be operated by the retailer or on behalf of the retailer, for example by a service provider or the mobile network operator. Generally, the retailer server 112 may manage multiple retailer databases, for example in case the retailer server manages a shopping mall.

Figure 2:
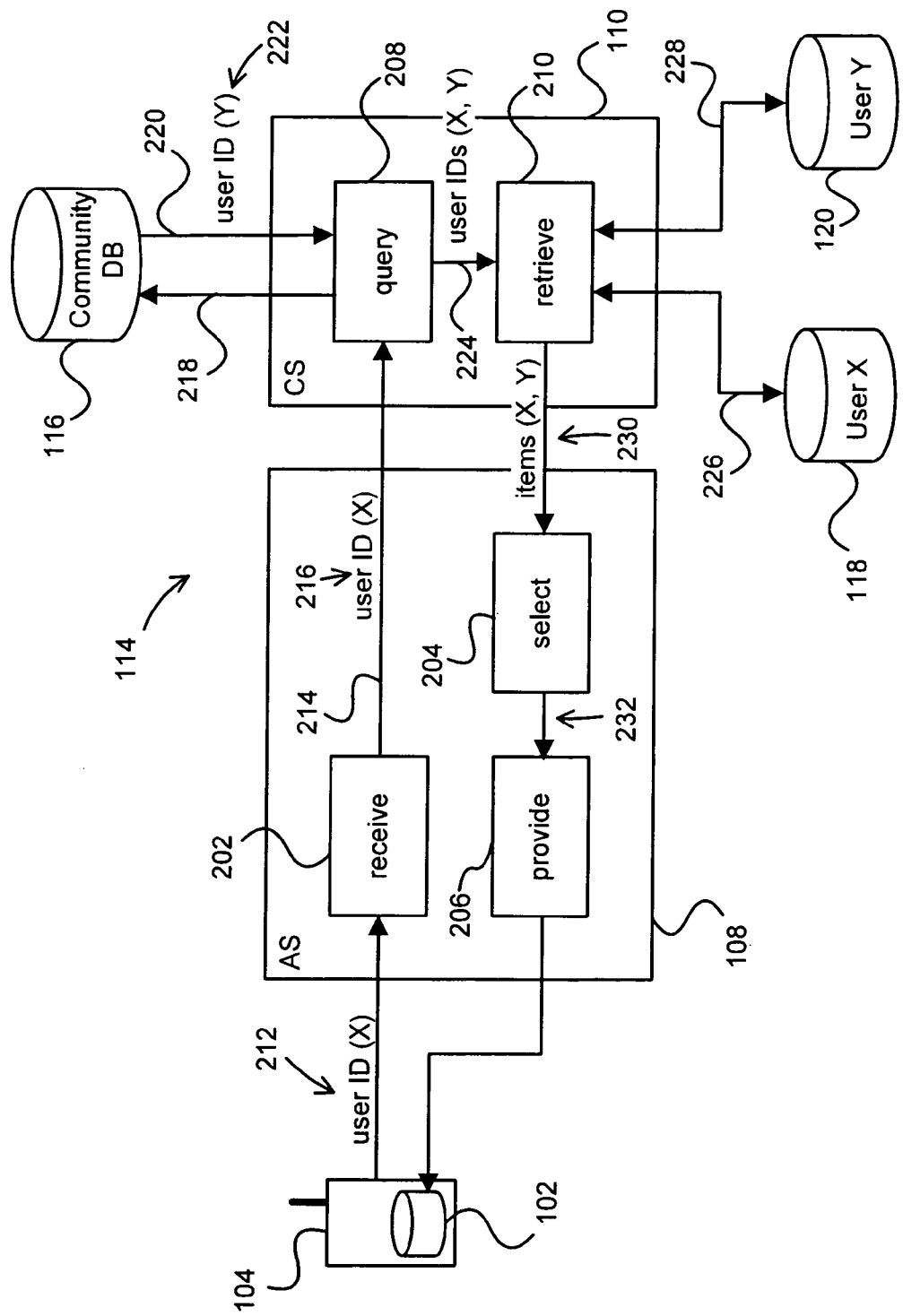
FIG. 2 is a functional block diagram illustrating an embodiment of the cache management server of FIG. 1.

FIG. 2 illustrates in some more detail functional components of an embodiment of the cache management server 114 of FIG. 1. The application server (AS) 108 is shown as comprising a reception component 202, a selection component 204 and a provisioning component 206. The community server (CS) 110 comprises in the embodiment of FIG. 2 a query component 208 and a retrieval component 210.

The functionality of one or both of the application server 108 and the community server 110 as illustrated in FIG. 2 and described below may be implemented in software, i.e. each of the blocks referenced as 108 and 110 in FIG. 2 may be understood as comprising a software and/or firmware package for implementation on a general purpose hardware, or on a more specific hardware such as one or more ASICs, FPGAs or DSPs. The AS 108 and CS 110 may be implemented on a common hardware platform, e.g. as a server in an IMS domain of mobile communications network 105 of FIG. 1. Alternatively, the AS 108 on the one hand and the CS 110 on the other hand may be implemented on separate hardware platforms. For example, the AS 108 may be implemented on a server platform in the mobile network 105, while the CS 110 may be implemented on a server platform in a social network to which the community database 116 (see below) is associated.

Figure 3:
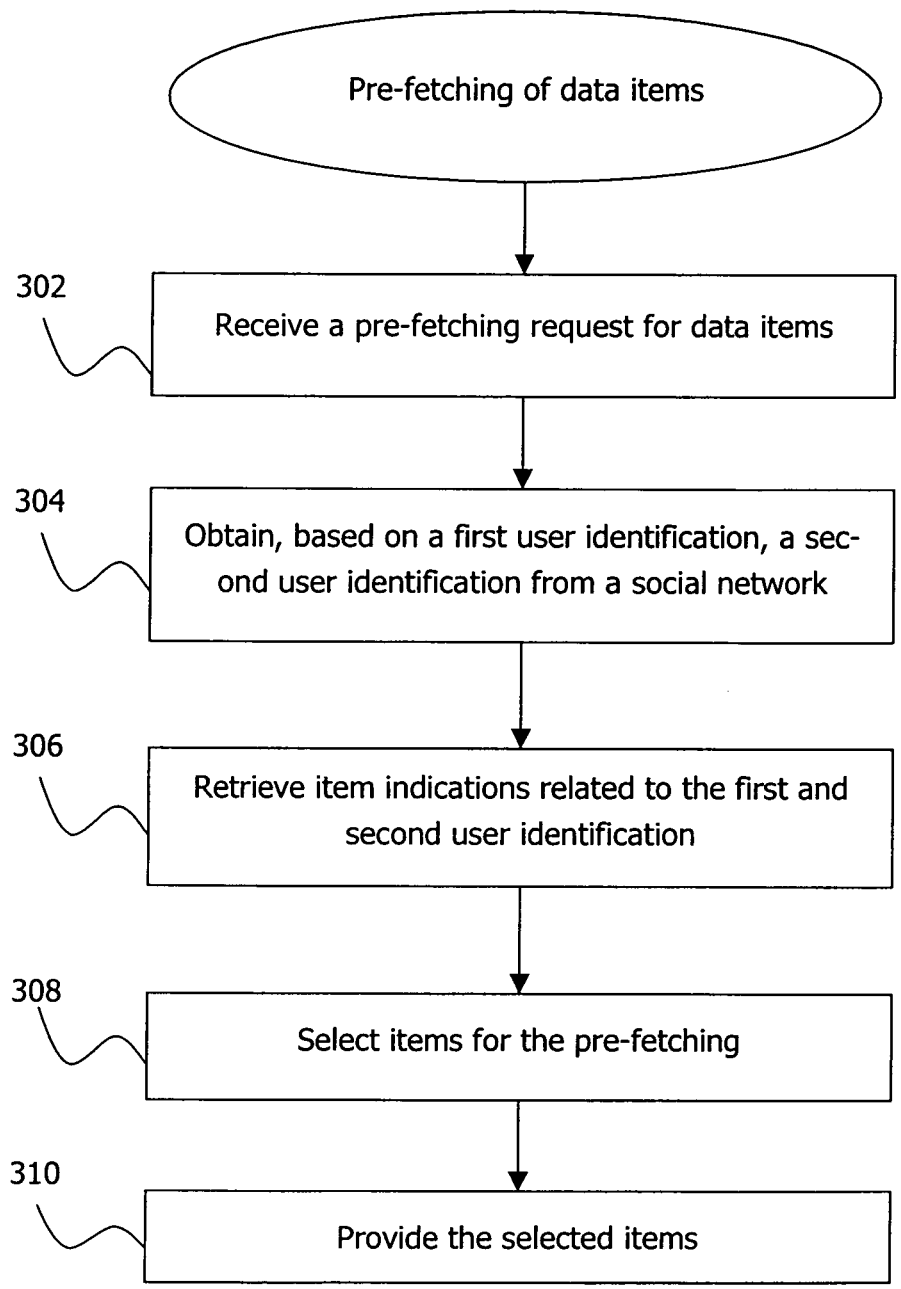
FIG. 3 is a flow diagram illustrating an operation of the cache management server of FIG. 2.

An operation of the CMS 114 of FIG. 2 will be described with reference to the flow diagram illustrated in FIG. 3. Generally, the CMS 114 operates to control a pre-fetching of data items into the cache 102 associated with mobile terminal 104. Consider a situation in which user X uses the mobile terminal 104 for a presentation of products offered by a local shop of the retailer of retailer server 112 in FIG. 1. User X is located in or near to the local shop whose products are represented in the local store database 124. In this situation, appropriate data items representing products of the local shop may be pre-fetched into cache 102 in order that these data items may be available to the user with minimal latency and desirable quality for example in case the user queries for the corresponding products.

In step 302, the reception component 202 receives a pre-fetching request 212 for data items from the mobile terminal 104. The request 212 includes a user identification (user ID) of user X, for example an MSISDN associated with the terminal 104. The reception component 202 may convert the received user ID into a system-internal user ID, one or more user IDs of one or more social networks and/or may keep the received user ID. In any case the reception component triggers the community server 110 by providing a message 214 including the one or more user IDs thereto. For the sake of clarity, it is assumed that only one user ID 216 is provided to the community server 110.

In step 304, the query component 208 of community server 110 operates, based on the user ID 216 received with message 214, to obtain one or more user IDs of users other than user X from the community database 116. Specifically, the query component 208 may transmit a database query 218 including the user ID 216 to the community database 112. The query may include further search parameters in order to identify users belonging to the same social group as user X in the community database 116. For example, the query component 208 may search in the community database 116 for users which are near to the location of mobile terminal 104 of user X and which have a similar gender, age, preferences, etc.

It depends on the implementation in which way these parameters may be determined. As one example, the current location may have been provided to the community server 110 in the request 214. Additionally or alternatively, the CMS 114 may operate to retrieve the current location of mobile terminal 104 from the mobile network 105 serving the terminal 104. In still other embodiments, the query component 208 may use the retrieval component 210 to access the user data repository 118 for user X (not shown in FIG. 2 for clarity) for retrieving parameters of interest for the social group search.

Having collected parameters such as location and age, the query component 208 may further prepare the search query 218 by defining a granularity in location and age. These additional range parameters may either be prescribed in the community server 110 or may be provided from the application server 108 to the community server 110. Eventually, the query component 208 transmits the query 218 to the community database 116 (or to several such databases). The query component 208 may make use of a social network service function for searching the community database provided by the social network the community database 116 is associated with. The response 220 indicates user IDs 222 of other users which are near to the current location of user X with the prescribed tolerance and which are similar in age with user X within a given range of ages. With signal 224, the query component 208 provides the user ID for user X as well as the retrieved user ID(s) 222 to the retrieval component 210.

In the example described here it is assumed that the retrieved user IDs 222 provided with signal 224 to the retrieval component 210 comprise a user ID of user Y (cf. FIG. 1). In step 306, the retrieval component 210 provides requests 226 and 228 to user data repositories 118 of user X and 120 of user Y, respectively, for retrieving data item indications stored therein. In more detail, the user data repositories 118 and 120 may be associated with various user IDs of users X and Y, respectively. For example, an MSISDN and a login name used by user X (Y) for logging into a Website provided by the retailer of retailer server 112 may both be associated with user data repository 118 (120). The login name of user Y may have been retrieved from the community database 116 and may then be used to access user data repository 120.

The request 228 may comprise additional parameters, for example the current location of terminal 104. The item indications stored in the user data repositories 118 and 120 may be associated with tag parameters such as location, store name, brand, etc. In case exactly one user data repository is kept for a particular user of the mobile network the CMS 114 is associated with, this repository may contain multiple sets of item indications which may, for example, be related to different shops. In response to the request 228, a subset of the item indications matching with the request parameters may be retrieved by the retrieval component 210 from the user data repository 120 of user Y.

The retrieval 226 of item indications for the user X from user data repository 118 may be performed in a similar way as has been described for retrieval 228. In step 308, the retrieval component 210 provides the retrieved item indications 230 to the selection component 204. In order to select items for the pre-fetching, the selection component 204 accesses the retailer server 112 (cf. FIG. 1) for retrieving item indications therefrom and then processes the item indications received from the retrieval component 210 and retailer server 112. The operation of the selection component 204 will be described in detail further below.

After having selected one or more item indications 232 for the pre-fetching, the selection component 204 inputs these into the provisioning component 206, which operates in step 310 to transmit the selected items in response to the pre-fetching request 212 to the cache 102. The provisioning component 206 may retrieve the data items corresponding to the received item indications 232 via retailer server 112 from one or both of databases 124 and 122. In the cache 102 the pre-fetched data items are stored for the case a user of terminal 104 requests a presentation thereof.

Figure 4:
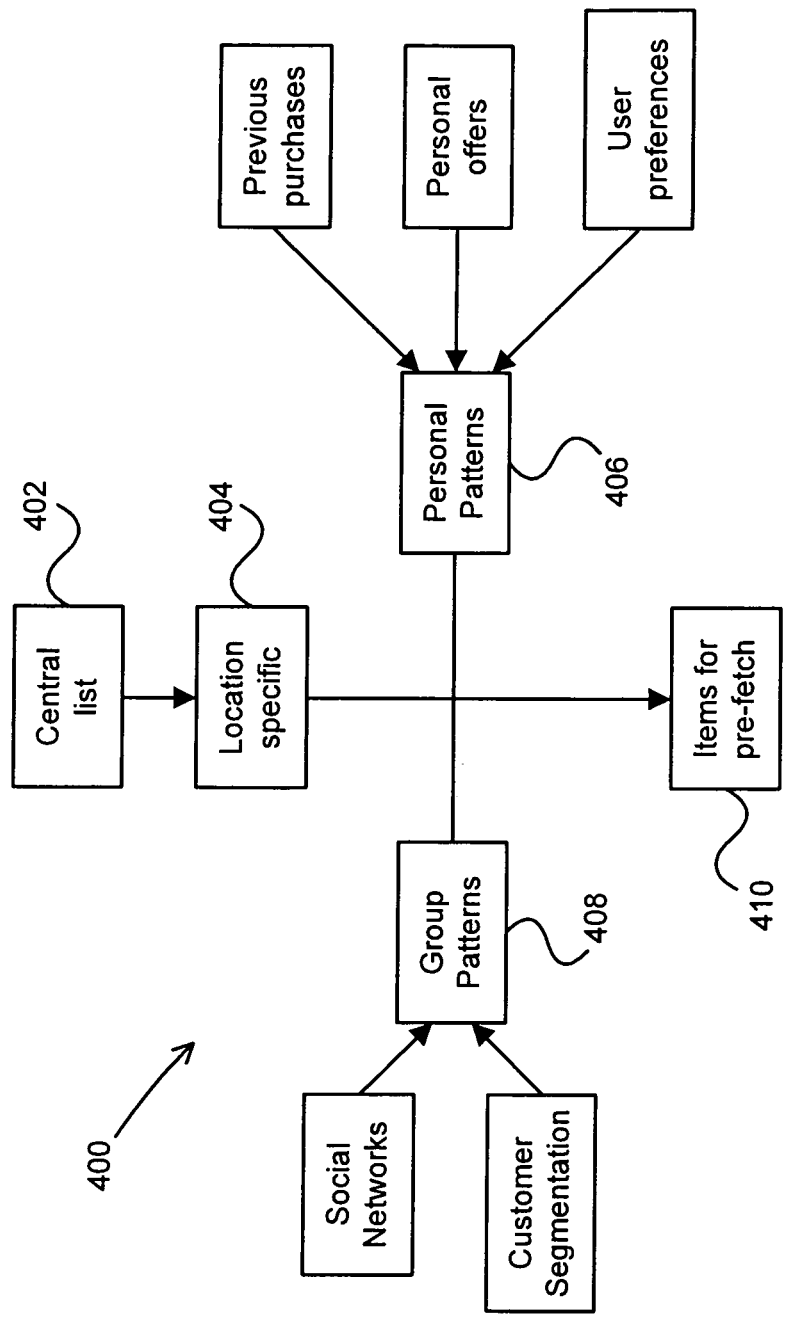
FIG. 4 schematically illustrates a data input to an operation of the cache management server of FIG. 2.

FIG. 4 schematically illustrates an embodiment of a data set 400 considered as an input into the selection routine performed in the cache management server 114. The data set 400 comprises a first data set 402 from the central retailer database 122. The first dataset 402 may, for example, comprise all the product IDs for the complete inventory of the retailer. The dataset 402 is then filtered by a second data set 404 from the local store database 124, the second data set 404 representing the products available in the local store. For example, the first data set 402 may represent the complete set of retailer products in GS1 GTIN format. An entry in the second data set 404 may refer to a corresponding entry in the first data set 402 in the form of a pointer or link. Filtering the complete set of retailer products 402 by the local data set 404 ensures that only product IDs may be selected which are actually present in the local store near to the mobile terminal 104.

While in FIG. 1 it is illustrated that it is the store server 114 which provides the data items (or identifiers thereof) from both the central retailer database 122 and the local database 124 to the CMS 114, in other embodiments the Cache Management Server 114 may directly access one or both of the central database 122 and the local store database 124, i.e. the CMS 114 may incorporate part or all of the functionality of the retailer server 112. Vice versa, in a configuration such as illustrated in FIG. 1, also the retailer server 112 may comprise the functionality of filtering the first data set 402 with the second data set 404, as described above.

The functionality of filtering the first data set 402 with the second data set 404 may be repeated for example upon a detection of the mobile terminal 104 that its location has changed, or upon the detection by the CMS 114 or the retailer server 112 that any of the first data set 402 and second data set 404 has changed. With regard to a change in location, the detection threshold for such change can be defined with different granularities. For example, a change may be detected when a user is entering or leaving a store, and/or a change may be detected when the user moves from one shop section to another. In any of these cases, the step of filtering the first data set 402 may be repeated based on different second data sets 404.

Further data sets 406 and 408 representing personal patterns and group patterns, respectively, provide for a further filtering of the data from the retailer databases.

Taking the example of user X associated with mobile terminal 104 of FIG. 1, the personal patterns 406 include the data received from the user data repository 118 of user X as has been described with reference to step 306 and retrieval 226 of FIGS. 3 and 2. For instance, the personal patterns 406 may comprise item indications related to previous purchases and offers received earlier from the retailer. Also user preferences such as "sports, electronics, travelling" may be stored in the user data repository and may contribute to selecting items for pre-fetching. In some embodiments, the personal patterns 406 may comprise multiple purchase histories for different retailers or may even comprise the entire purchase history of the user when using the mobile terminal, for example in case user data repository 118 is hosted by the mobile network operator providing the cache management server 114.

As shortly discussed further above, storing personal patterns in a user data repository such as repository 118 may be complemented by tagging the stored item indications with additional parameters. As an example, an item indicator may be tagged by indications of a location and a time of purchase. The item indication indicative of the purchased product may be stored together with these tags in the user data repository. The tagging may be performed automatically by associating a time stamp and a location indication with the item indication. The location indication may, for example, be determined automatically by the mobile network. For example, the location may be a geographical indication determined by a location-based service provided by the mobile network. The location may additionally or alternatively comprise an indication of a shop, a shopping mall or a retailer. Respective data may be taken from the data transceived by the mobile terminal in an application layer.

In some embodiments, tagging may also be performed manually. For instance, the user may tag an item according to its intended use or goal, e.g. the user may enter text into a tag form (e.g. "wedding gift") or choose from a menu provided to him or her by the mobile terminal. The user may additionally rate the item. A ranking may also be performed by the cache management server, as will be described below, and may be performed based on, for example, the number of times an item has been queried or bought. Generally, items (or indications thereof) may be ranked high as being likely to be purchased again, for example based on a particular location, store, and/or type of store. Consider, for example, that many users may buy regularly particular products in a supermarket. As another example for a ranking mechanism, items that are affected by seasonal changes may be included or excluded, i.e. may be ranked higher or lower.

Turning to the group patterns 408 illustrated in FIG. 4, these patterns comprise data retrieved from one or more other user data repositories besides that for user X. In the example of FIG. 2, in particular data from the repository 120 for user Y are retrieved and contribute to the group patterns 408. The group patterns 408 thus comprise further items (item indications) purchased by users such as user Y, which are assumed to belong to the same community or social group as user X. Such assumption may be based on determining users sharing common attributes such as age, gender and location. For example, user Y of terminal 106 may have been determined by community server 110 as belonging to the same social group as user X of terminal 104 because a search in the community database 116 has revealed user Y as having a similar age, gender and current location as user X.

It is to be noted that group patterns such as patterns 408 may also be used for determining items for pre-fetching even in case there are no personal patterns such as patterns 406 available. A typical example may be a new customer or a customer which for some reason has not logged in into the retailer web site. In this case no user data repository may exist or it may be unknown. While age and gender of the user may also not be available, at least a location of the terminal may be available and may be used to determine data items which might be of interest to the user. In other cases a user profile and/or user data repository may exist, but no or few item indications may be stored therein because the user is, for example, new in a shop. Then nevertheless item indications may be selected for pre-fetching, from user data repositories of other users identifies as belonging to the same community, social group or social network.

The community database and the user data repositories may be dynamically updated at any time in response to activities such as shopping activities of the users of the network. Hosting cache management services such as described here for a plurality of retailers may also contribute to improve recommendations and thus minimize network load as it is possible to connect to the behavior of other users in a social network in real time. For instance, the following recommendation would be possible: "People in your network close to your location are buying items A and B for wedding gifts right now".

Based on the location specific data items 404, personal patterns 406 and group patterns 408, a selection routine may determine items 410 for pre-fetching, as will be described now.

Figure 5:
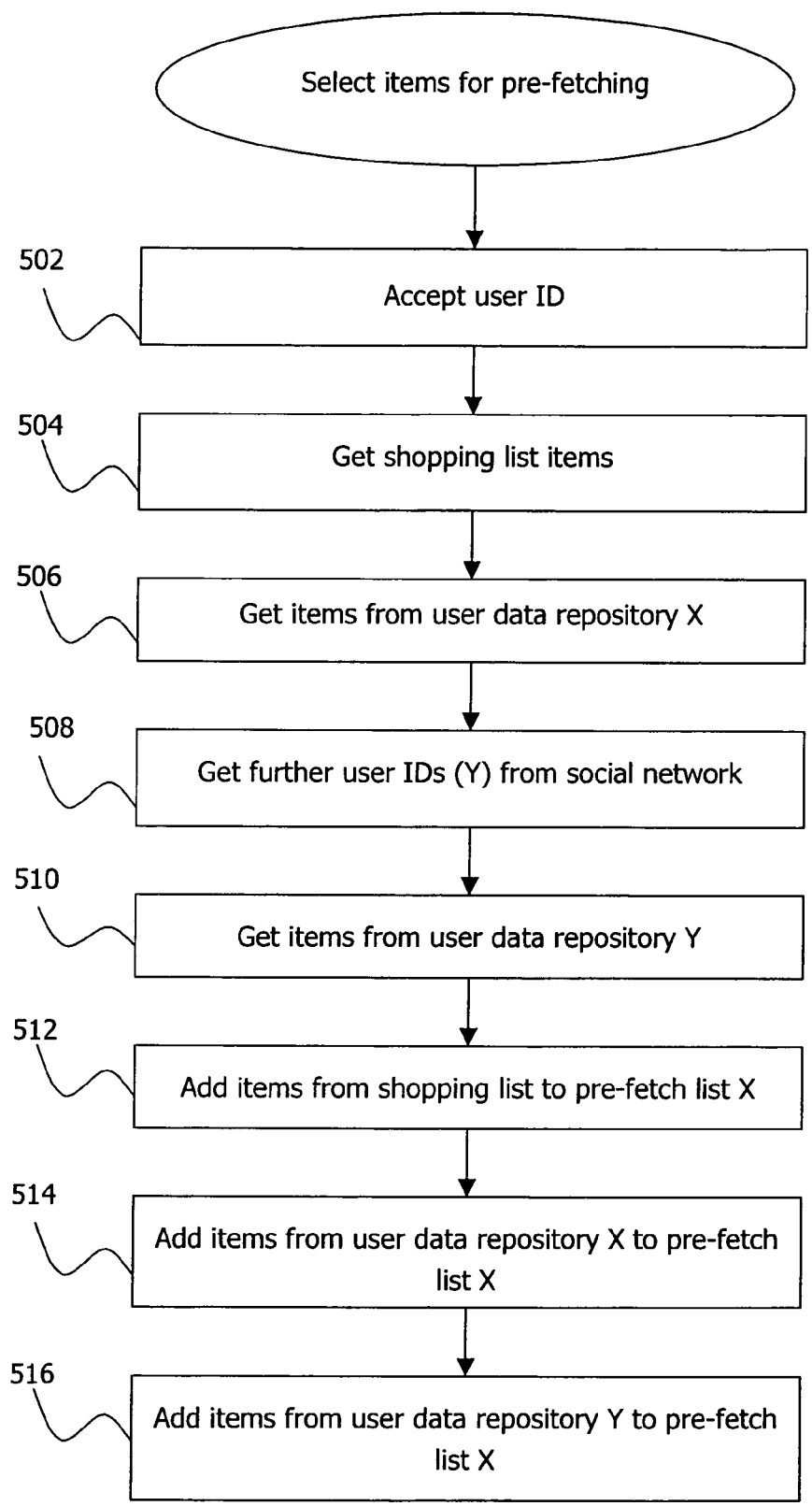
FIG. 5 illustrates an example of a procedure for selecting items for pre-fetching.

FIG. 5 illustrates an example of a selection procedure 500 which may implement at least partially the selection component 204 of FIG. 2. However, for the sake of clarity also parts of the functionality of query component 208 and retrieval component 210 are included. Again the example of selecting items for pre-fetching into the cache 102 of terminal 104 of user X underlies the discussion of procedure 500.

In step 502, the procedure 500 accepts a user ID of user X. The procedure 500 may further accept a (current) time, a location of the mobile terminal 104, an indication of a shopping list, an indication characterizing the current shopping activity, which may comprise a type of store currently visited, e.g. "gifts, such as wedding gifts, birthday gifts", etc. The procedure 500 further comprises in step 504 to receive item indications from the shopping list and in step 506 to receive the purchase history, i.e. item indications, from the user data repository 118 for user X. In step 508, further user IDs, e.g. for user Y, are obtained from the community database 116 as has been described with reference to step 304 in FIG. 3. With execution of step 510, item indications are retrieved from the user data repository 120 of user Y (step 306).

During execution of step 512, a pre-fetch list for user X is for the first time collected from items on the shopping list (if it exists and is not empty). As a concrete example for step 512, it may be tested, for each item in the shopping list, whether the item exists at the location of user X, i.e. whether the item is available at the local store. Those items, for which the condition is fulfilled, may be added to the pre-fetch list for user X and may be ranked high for the pre-fetching.

In step 514, an item received from the user data repository 118 for user X is added with, e.g., medium priority to the pre-fetch list X if this item exists at the location of user X. In case a tag is associated with the item (e.g., "wedding gift"), and this item matches with a shopping activity, the item may be included with a high priority in the pre-fetch list. Additionally or alternatively, a selected item may be ranked high in case a timestamp associated therewith equals a current time.

With execution of steps 516, further items are added to the pre-fetch list for user X based on the items retrieved from the user data repository 120 for user Y. As a concrete example, an item from user data repository 120 may be added with, e.g., medium priority to the pre-fetch list X if it is available at the location of user X. In case a tag is associated with the item and this item matches with a shopping activity, the item may be included with a high priority in the pre-fetch list X. Additionally or alternatively, a selected item may be ranked high in case a timestamp associated therewith equals a current time.

The pre-fetch list for user X eventually contains a list of indications of products, i.e. product IDs, and for each product ID an associated priority level or ranking. This list may then be used as a basis for the pre-fetching in the provisioning component 206 (FIG. 2).

While not shown in FIG. 5, a selection routine may additionally or alternatively comprise a part for joined processing of items from user data repositories of user X and other social group users such as user Y. The processing may, for example, comprise a determination whether any item occurs in both personal patterns and group patterns and ranking such matching items high. Referring back to FIG. 4 with regard to a ranking of item indications, a selection routine may generally rank with highest priority item indications present both in personal patterns 406 and group patterns 408, because these items may be considered as being most likely to be queried, thus these items should be pre-fetched with highest priority. Items present only in personal patterns 406 may be ranked with next highest priority and items only present in group patterns 408 may be ranked low.

A matching and ranking routine may simply determine a number count of item indications in a social group. Consider a shopping environment in which all products of a store have assigned a unique product ID therewith, for example based on the GS1 GTIN framework. A relative priority of items may then be based on the frequency of occurrence of product IDs in the social group formed by the users being currently or generally customers of this shop. Other ranking mechanisms may additionally or alternatively be applied. For example, a ranking based on an item occurrence in personal and group patterns may be modified according to current marketing efforts of the retailer, availability of products in a local store near to a current location of the user, etc.

Figure 6:
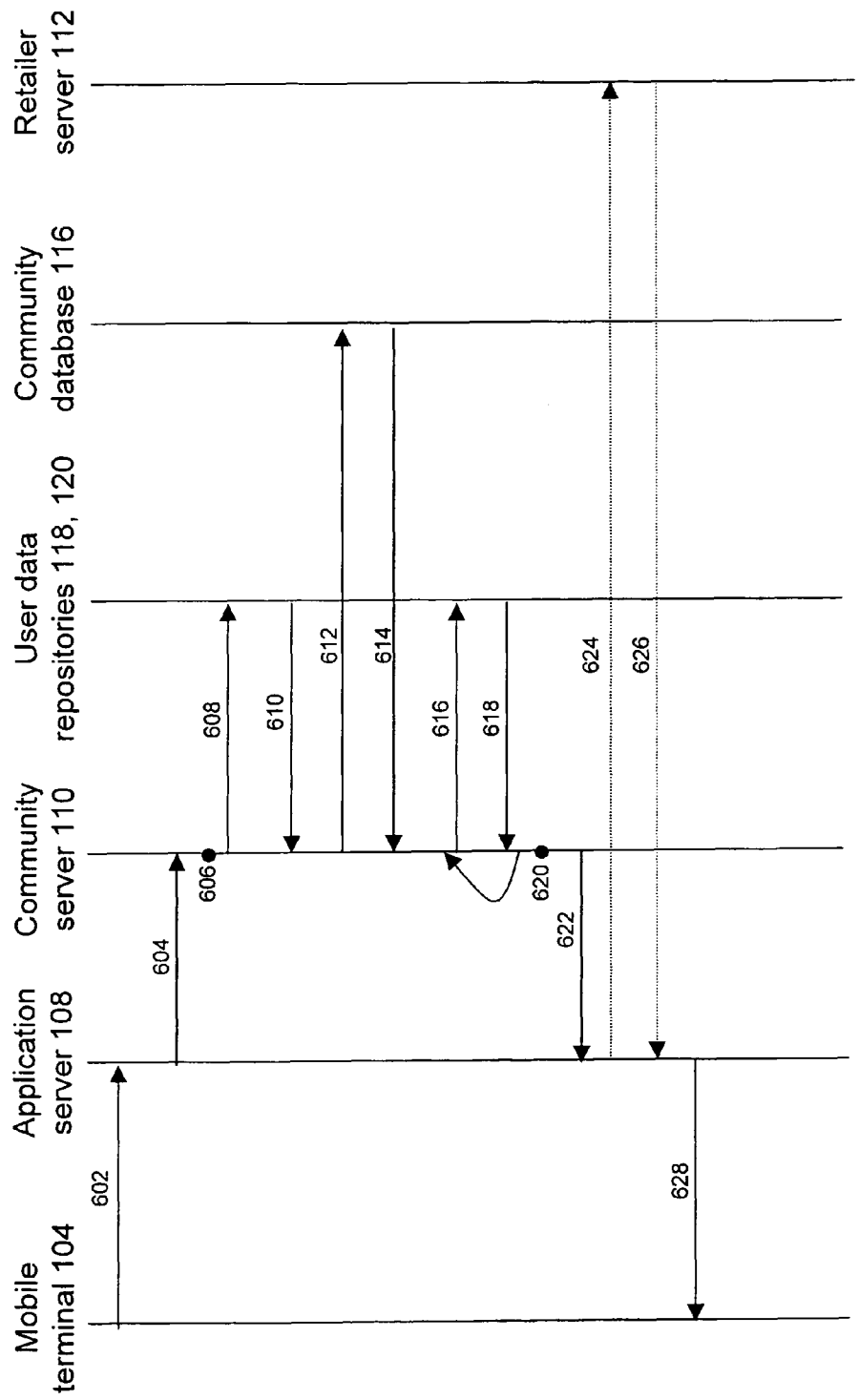
FIG. 6 is a sequence diagram illustrating a first cache management procedure in the system of FIG. 1.

FIG. 6 illustrates an embodiment of a message sequence which may be performed in the cache management system 100 of FIG. 1 for controlling a pre-fetch to the cache 102 of terminal 104. In comparison to the embodiment of FIG. 2, some more functionalities have been shifted into the community server which serves to illustrate the various possibilities for configuring the interaction of application server part and community server part in a cache management server.

In step 602, the mobile terminal 104 sends a pre-fetch request to the application server 108. The step 602 may be implemented as an HTTP GET request including as arguments, for example, an application layer user ID of user X and/or an IMSI related to mobile terminal 102 of user X. The request may further include context-related data such as a location indication as well as items, which may be items currently contained in a shopping list kept on the mobile terminal 104.

In step 604, the application server 108 operates to forward the request to the community server 110. The forwarded request may also be an HTTP GET request including the same arguments as the message received in step 602 by the application server 108. In some embodiments, however, an IMSI of user X may have been mapped to a login name of user X. In step 606, the community server 110 determines the proper user data repository 118 associated with the received user ID of user X. In step 608, the community server 110 sends an SQL query to the identified repository 118 including an indication of the current location of a terminal 104. The query may also comprise the user ID of user X. In addition, the item indications or particular aspects thereof such as type of goods, brands, etc. may be included in the SQL query in order to search for similar items. In step 610, the user data repository 118 responds to the community server 110 with providing additional item indications which may relate, for example, to similar products bought by user X earlier at the indicated location.

The step 606 may comprise further processing to determine membership of user X in one or more social networks, communities, or social groups. Based on the result of this determination, in step 612 (which may be performed in parallel with step 608), the community server 110 requests from the determined community database 116 users which are associated with user X in a social group or network. For providing the request to the community database, a community-specific API (Application Programmer Interface) may be used. For example, social networks or communities such as Facebook or LinkedIn provide the REST (Representational State Transfer) API for access thereto. In step 614, the community database 116 returns in response to the request of step 612 indications of one or more users associated with user X as being in the same social group to the community server 110. Referring to the example configuration of FIG. 1, for example a user indication of user Y is provided to the community server 110.

In step 616, the community server 110 sends an SQL query to the user data repository 120 including the user Y as identified in the response 614. The current location of user X may be included in the query, as well as item indications or aspects thereof as received in one or both of steps 604 and 610. In step 618, the repository 120 responds with providing additional items to the community server 110.

In step 620, a selection routine such as that illustrated in FIG. 5 is performed in the community server 110 (note that according to the embodiment illustrated in FIG. 2 the selection may alternatively be performed in the application server 108). Generally, the additional items of user Y (and still other users) returned in step 618 may either simply be added to the items of user X returned in step 610, or a joined processing may be performed on both sets during which, as discussed above, for example matching items may be identified. Step 620 may further comprise a ranking of the returned items.

In step 622, the community server 110 provides in a HTTP response to the HTTP request of step 604 the list of selected items to the application server 108. The list may include all selected items or may comprise a maximum number of items as dependent on, e.g., available transmission capacity or storage capacity of cache 102 in mobile terminal 104. In the latter case, items may be selected for pre-fetching according to their priority.

In step 624, the application server 108 may optionally request additional data such as additional product information either from the retailer server 112 (or directly from, e.g., the central database 122). In step 626, the retailer server 114 responds with providing the additional information. For the request/response pair 624/626, a REST or SOAP (Simple Object Access Protocol) interface may be used. In response to the HTTP request 602, in step 628 the selected list of items for pre-fetching is provided in a HTTP response to the mobile terminal 104. The list may also contain recommendations and offers. A cache management routine in the terminal may then initiate actual retrieval of the selected items for buffering in the cache 102.

Figure 7:
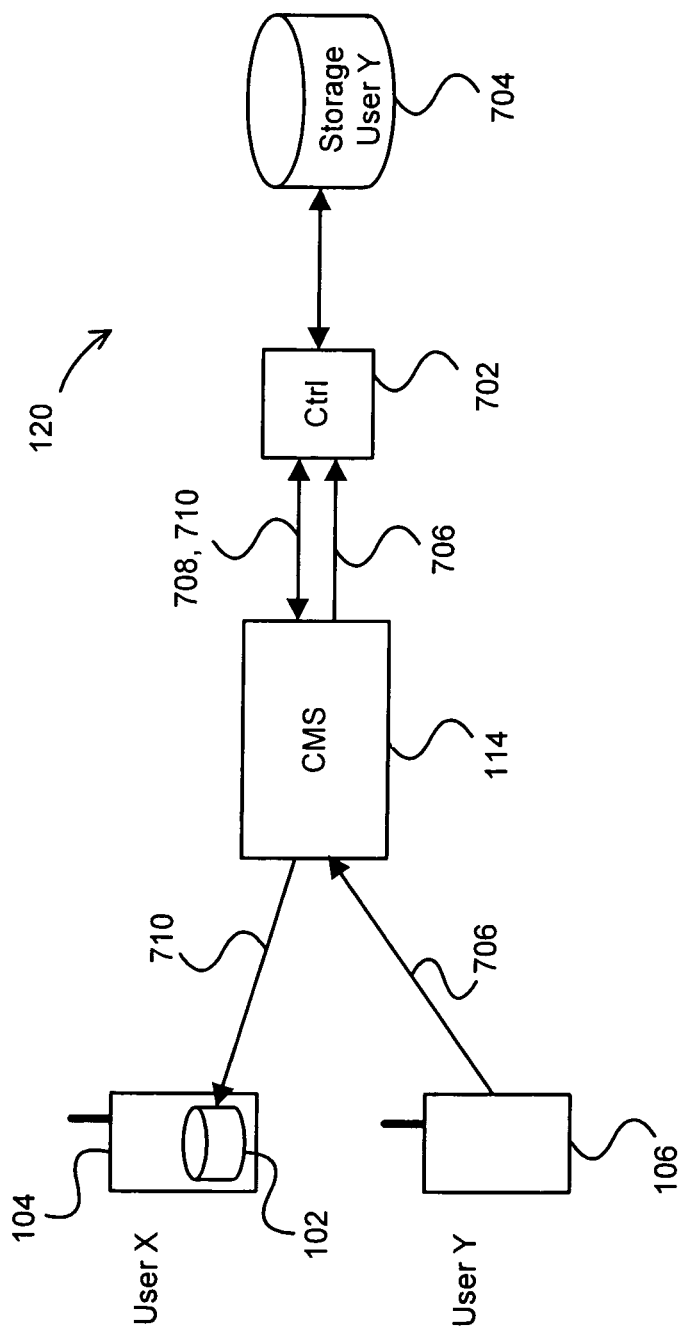
FIG. 7 is a functional block diagram illustrating an embodiment of one of the user data repositories of FIG. 1.

FIG. 7 is a schematic illustration focusing in further detail on a portion of the cache management system 100 of FIG. 1 related to the user data repository 120 dedicated to user Y of mobile terminal 106. The cache management server 114 is assumed to include functionalities of the application server 108 and community server 110 as is illustrated in FIG. 1. The user data repository 120 comprises a control component 702 and a storage component 704.

The functionality of the user data repository 120 as illustrated in FIG. 7 and described below may be implemented in software, i.e. the blocks referenced as 120 in FIG. 7 may be understood as comprising a software and/or firmware package for implementation on a general purpose hardware, or on a more specific hardware such as one or more ASICs, FPGAs or DSPs. The user data repository 120 may be implemented, e.g., together with user data repository 118 and multiple further user data repositories on a common hardware platform in the mobile communications network 105 of FIG. 1.

Figure 8:
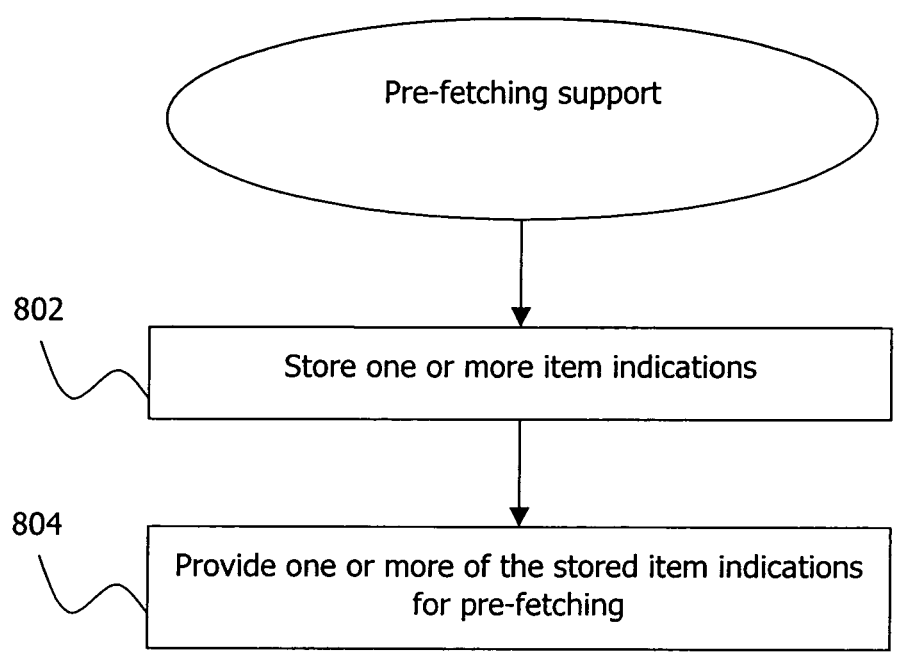
FIG. 8 is a flow diagram illustrating an operation of the user data repository of FIG. 7.

A functionality related to the user data repository 120 will now be described with reference to the flow diagram in FIG. 8. Generally, the user data repository 120 dedicated to user Y is provided to support a pre-fetching of data items into the cache 102 of terminal 104 which is related to user X. It is assumed that user Y performs a shopping activity using the mobile terminal 106. For example, user Y may purchase a product item, may receive an offer for a product item, or may query a product item. In any of these cases the cache management server 114 may monitor the shopping activity and may provide the corresponding data item or an indication 706 thereof, e.g. a product ID, towards the user data repository 120. Triggered thereby, in step 802 the item indication 706 related to user Y is stored in the storage component 704 of repository 120. Additional data (tags) may be stored in association with the item indication 706; for example, the control component 702 may operate to tag a timestamp to the entry. In this respect, the cache management server 114 may provide the item indication 706 together with an indication of time, location etc. to the control component 702. In other embodiments, the control component 702 may trigger a determination of the current time and the location of user Y.

In case items for pre-fetching are determined for user X, and user Y belongs to the same social group as user X, the cache management server 114 provides a trigger 708 to the user data repository for item indications of user Y. In response to trigger 708, in step 804 the control component 702 operates to access the storage component 704, to retrieve according to parameters provided with the trigger 708 at least a subset of the item indications stored in storage component 704, and provide these item indications 710 including tagged data to the CMS 114 for possibly pre-fetching the corresponding items to cache 102 in mobile terminal 104 associated with user X.

Figure 9:
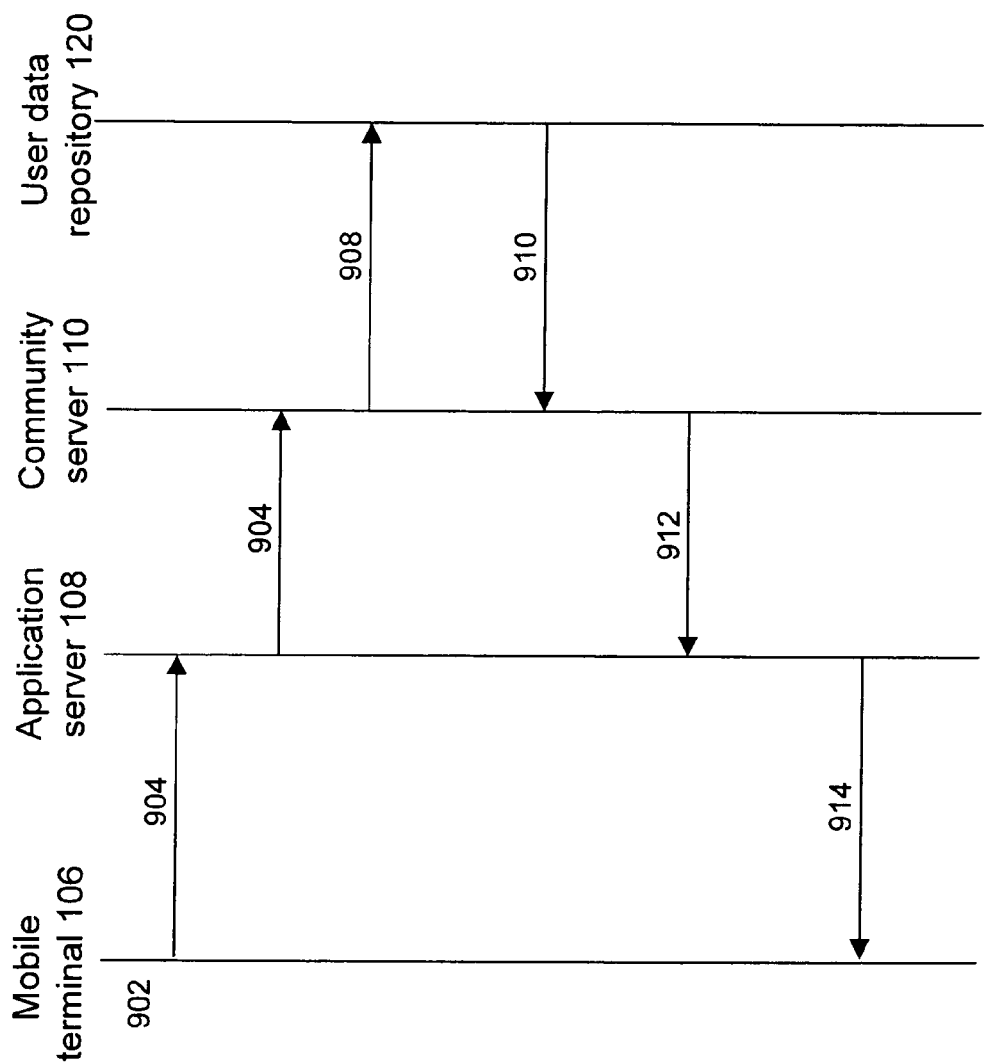
FIG. 9 is a sequence diagram illustrating a second cache management procedure in the system of FIG. 1.

FIG. 9 illustrates an embodiment of a message sequence which may be performed in the cache management system 100 of FIG. 1 for supporting a pre-fetch of appropriate data items to cache 102 in mobile terminal 104 of user X. Generally, the message sequence in FIG. 9 is related to storing item indications in user data repository 120 associated with user Y.

In step 902, the mobile terminal 106 operates to support a shopping activity of user Y; for example user Y may buy a product item, receive an offer or queries for a product item. The mobile terminal 106 is adapted to log purchased objects, to provide some automatic tagging and some possibility for the user to manually enter tags. The terminal 106 is configured for preparing, based on such activity, a dataset which includes a data item representative of the subject product, and which possibly includes associated tags indicating a location, a product price and type, a reason for buying, etc.

In step 904, the terminal 106 transmits the tagged item indication in an HTTP PUT message towards the cache management server 114 of FIG. 1, more precisely the application server 108 thereof. The HTTP PUT may comprise, for example, a user ID of user Y, a (current) location of the user Y, the one or more product items subject of the shopping activity and the associated tags. In step 906 the application server 108 forwards the HTTP PUT message towards the community server 110. In step 908, the community server 110 has identified, based on the user identification of user Y, the associated repository 120 and applies, for example, an SQL method to insert the data, i.e. the items and associated tags, in the repository 120. In the user data repository 120, the received item indications and tags may be stored as has been described exemplarily with the embodiment of FIG. 7 and step 802. In step 910, the repository 120 acknowledges successful storage of the received data to the community server 110 in an SQL response. In steps 912 and 914, successful execution is indicated in a HTTP response to the application server 108 and mobile terminal 106, respectively.

The techniques proposed herein can form the basis for improved pre-fetching schemes. When selecting data items for a pre-fetch into a cache associated with a mobile terminal, accounting for items associated with other users belonging to the social group of the user of the mobile terminal in terms of, e.g., age, gender, location, membership in a social network community, etc., allows selecting items which are more likely of interest for the user. This avoids a waste of resources for transmission and caching of unwanted data items while keeping the general advantage of pre-fetching, namely the minimized latency in presentation of items to the user. Thus, transmission resources can be saved in the network, e.g. over the radio interface. Further, a cache provided in the mobile terminal can be minimized in terms of storage resources. Also in a configuration in which the cache is generally provided in the network, considerable resources can be saved as the network may have to provide caching for a possibly large number of mobile terminals.

On the other hand, given transmission and storage resources may be more efficiently utilized, i.e. a presentation quality of the data items may be improved, e.g. by providing an increased resolution to images. While the proposed techniques have been illustrated in a shopping environment, the advantages outlined above can be realized within any framework in which personalized content is distributed to users, consider for example a personalized news service.

While the current invention has been described in relation to its preferred embodiments, it is to be understood that this description is for illustrative purposes only. Accordingly, it is intended that the invention be limited only by the scope of the claims appended hereto.

The invention claimed is:

1. A method performed by a cache management server for controlling a pre-fetching of data items into a cache associated with a first mobile terminal, the method comprising:
   receiving a pre-fetching request for data items to be provided by a mobile communications network to the first mobile terminal, for presentation of those data items to a user of the first mobile terminal, responsive to a geographical indication provided by the mobile communications network exceeding a detection threshold for a location granularity indicating entering of a retailer location by the first mobile terminal, wherein the pre-fetching request comprises a first user identification associated with the first mobile terminal;
   obtaining at least one second user identification from a community database containing user profiles of users of a social network, based on one or more attributes from the user profile associated with each of said at least one second user identification matching one or more attributes from a user profile associated with the first user identification;
   selecting items for the pre-fetching based on the obtained at least one second user identification and the entered retailer location;
   retrieving data items corresponding to the selected items from a server associated with the entered retailer location; and
   providing the retrieved data items in response to the pre-fetching request.

2. The method according to claim 1, wherein the cache comprises at least one of a cache in the first mobile terminal and a cache in an access network portion of the mobile communications network providing access for the first mobile terminal.

3. The method according to claim 1, wherein obtaining the at least one second user identification comprises using a social network service function of the social network to search for the at least one second user identification among a plurality of user identifications forming the community of the social network, each user identification being related to one of the user profiles hosted in the community database.

4. The method according to claim 1, wherein the social network is separate from the mobile communications network.

5. The method according to claim 1, further comprising retrieving, from a user data repository containing item indications related to the at least one second user identification, one or more community-based item indications, wherein the selection of items for the pre-fetching is based on the retrieved community-related item indications.

6. The method according to claim 5, further comprising retrieving, from a user data repository containing data item indications related to the first user identification, one or more personal item indications, wherein the selection of items for the pre-fetching is based on the community-based item indications and the personal item indications.

7. The method according to claim 6, wherein the selection of items for the pre-fetching comprises selecting items based on matching community-based item indications with personal item indications.

8. The method according to claim 1, further comprising selecting the social network from multiple social networks based on the first user identification.

9. The method according to claim 1, wherein the second user identifications are obtained based on one or more attributes from a user profile associated with the first user identification.

10. The method according to claim 9, wherein the attributes comprise a location of the first mobile terminal.

11. The method according to claim 10, wherein items for the pre-fetching are selected based on item indications of a second user identification related to a user near to the location of the first mobile terminal.

12. A method performed by a user data repository for supporting pre-fetching of data items into a cache associated with a first mobile terminal, wherein the user data repository is associated with a second mobile terminal, the method comprising:
   storing, triggered by an operation performed by the second mobile terminal, one or more item indications; and
   providing, in response to a query from a cache management server, one or more of the stored item indications for pre-fetching into the cache associated with the first mobile terminal.

13. The method according to claim 12, wherein the operation performed by the second mobile terminal relates to a shopping activity comprising at least one of purchasing a product item, receiving an offer for a product item and querying a product item.

14. The method according to claim 12, wherein the one or more item indications are stored in association with an indication of a location of the second mobile terminal.

15. A cache management server configured to control a pre-fetching of data items into a cache associated with a mobile terminal, comprising:
   a reception circuit configured to receive a pre-fetching request for data items to be provided by a mobile communications network to the mobile terminal, for presentation of those data items to a user of the mobile terminal, responsive to a geographical indication provided by the mobile communications network exceeding a detection threshold for a location granularity indicating entering of a retailer location by the mobile terminal, wherein the pre-fetching request comprises a first user identification associated with the mobile terminal;
   a query circuit configured to obtain at least one second user identification from a community database containing user profiles of users of a social network, based on one or more attributes from the user profile associated with each of said at least one second user identification matching one or more attributes from a user profile associated with the first user identification;
   a selection circuit configured to select items for the pre-fetching based on the obtained at least one second user identification and the entered retailer location;
   a retrieval circuit configured to retrieve data items corresponding to the selected items from a server associated with the entered retailer location; and
   a provisioning circuit configured to provide the selected items in response to the pre-fetching request.

16. The cache management server according to claim 15, wherein the retrieval circuit is further configured to retrieve, from a user data repository containing item indications related to the at least one second user identification, one or more community-based item indications, and wherein the selection circuit is configured to select the items for the pre-fetching based on the retrieved community-related item indications.

17. The cache management server according to claim 16, wherein the retrieval circuit is further configured to retrieve, from a user data repository containing data item indications related to the first user identification, one or more personal item indications, and wherein the selection circuit is configured to select the items for the pre-fetching based on the community-based item indications and the personal item indications.

18. The cache management server according to claim 15, wherein the cache management server is configured to receive location indications related to at least one of the first and second user identifications and wherein the selection circuit is configured to select the items for the pre-fetching based on the received location indications.

19. The cache management server according to claim 15, wherein the query circuit is configured to use a social network service function of the social network to search for the at least one second user identification among a plurality of user identifications forming the community of the social network, each user identification being related to one of the user profiles hosted in the community database.

20. A user data repository that is coupled to and that is configured to support a cache management server configured to control a pre-fetching of data items into a cache associated with a first mobile terminal, wherein the user data repository is associated with a second mobile terminal and comprises:
   a memory configured to store, triggered by an operation performed by the second mobile terminal, one or more item indications; and
   a control circuit configured to provide, in response to a query from the cache management server, one or more of the stored item indications for pre-fetching into the cache associated with the first mobile terminal.

21. A cache management system comprising:
   a cache management server configured to control a pre-fetching of data items into a cache associated with a mobile terminal, comprising:
      a reception circuit configured to receive a pre-fetching request for data items to be provided by a mobile communications network to the mobile terminal, for presentation of those data items to a user of the mobile terminal, responsive to a geographical indication provided by the mobile communications network exceeding a detection threshold for a location granularity indicating entering of a retailer location by the mobile terminal, wherein the pre-fetching request comprises a first user identification associated with the mobile terminal;
      a query circuit configured to obtain at least one second user identification from a community database containing user profiles of users of a social network, based on one or more attributes from the user profile associated with each of said at least one second user identification matching one or more attributes from a user profile associated with the first user identification;
      a selection circuit configured to select items for the pre-fetching based on the obtained at least one second user identification and the entered retailer location;
      a retrieval circuit configured to retrieve data items corresponding to the selected items from a server associated with the entered retailer location; and
      a provisioning circuit configured to provide the selected items in response to the pre-fetching request; and
   a user data repository that is coupled to and that is configured to support a cache management server, wherein the user data repository is associated with a second mobile terminal and comprises:

a memory configured to store, triggered by an operation performed by the second mobile terminal, one or more item indications; and a control circuit configured to provide, in response to a query from the cache management server, one or more of the stored item indications for pre-fetching into the cache associated with the first mobile terminal.

* * * * *